A. Barbarin.
Carburetting App.

No 3892. Reissued Mch 22. 1870.

Witnesses.

A. E. Dupas

Paul Dorcatt

Inventor.

Arthur Barbarin

UNITED STATES PATENT OFFICE.

ARTHUR BARBARIN, OF NEW ORLEANS, LOUISIANA.

IMPROVEMENT IN APPARATUS FOR CARBURETING AIR AND GAS.

Specification forming part of Letters Patent No. 95,412, dated October 5, 1869; Reissue No. 3,892, dated March 22, 1870.

*To all whom it may concern:*

Be it known that I, ARTHUR BARBARIN, of New Orleans, State of Louisiana, have invented a certain Improved Mode of Indicating the Rise and Fall of Hydrocarbon in Carbureting-Machines and of Carbureting Atmospheric Air, of which the following is a specification.

My invention relates to a mechanical arrangement for indicating with absolute certainty the rise and fall of the hydrocarbon employed to carburet air with the view of its use for illuminating purposes; to a method of carbureting air as it is used and in just such quantity as for the time being may be required for use; and to adapt the machine to varying seasons, to all conditions of temperature in the surrounding air, and for supplying air continuously, or by a continuous current or currents, through the carburetor, my objects being, first, to preserve uniformity of quality in the gas or carbureted air; second, to obviate the inconvenience resulting from the condensation inseparably incident to an accumulation of carbureted air in a recipient prior to its use; thirdly, to preserve a uniform temperature in the carburetor under all conditions of the air outside the same; and, fourthly, to provide a regular and sufficient supply of carbureted air to the burners, whatever may be their number, notwithstanding the same is produced only at the time it is needed for use.

Figure 1:
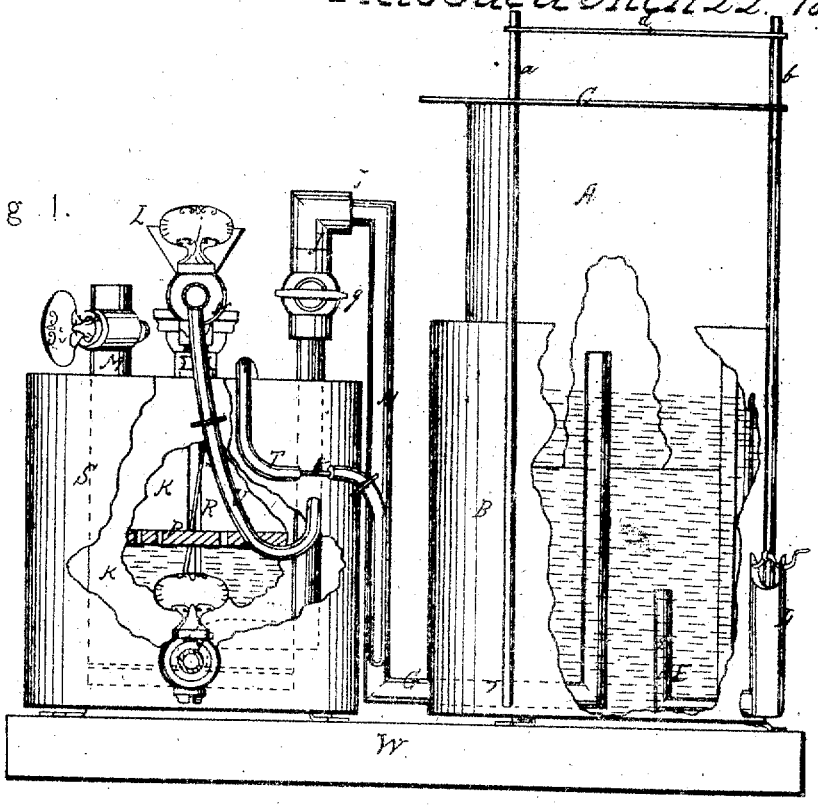
Figure 2:
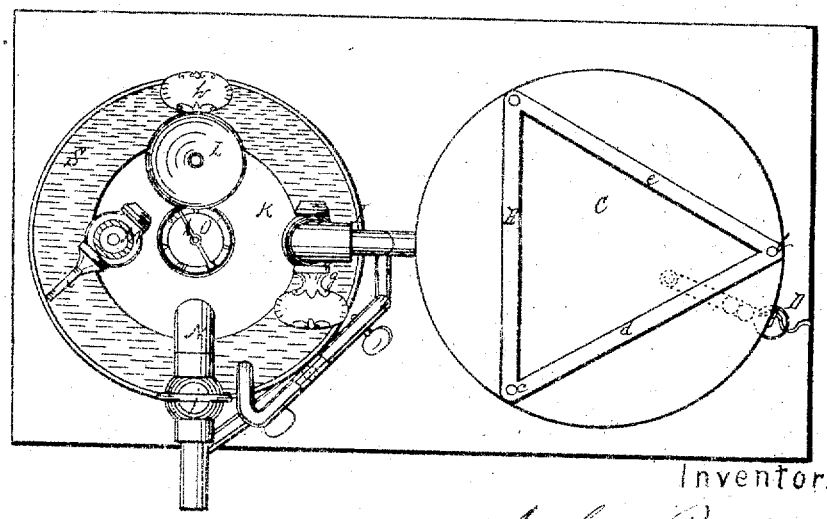

In the accompanying drawings, Figure 1 is a side elevation, with parts of the apparatus broken away to show the interior arrangement; and Fig. 2, a plan or top view of my invention.

A is an air recipient and holder, which is placed within a water-tank, B, sustained by guide-rods *a b c*, that pass through the projecting rim of the recipient, as shown. The rods *a b c* are secured on the outside of the tank B in any proper way and by any proper means, and held in parallel relation to each other by braces *d e f*.

An ordinary air-pump, D, is connected with the tank B in such manner that the end of its eduction-pipe E, which has a horizontal section, 1, and a vertical section, 2, will be elevated to about the height of the pump in the interior of the tank, so that the air forced through the same will ascend into the recipient A, wherein it is retained by the water therein and in the tank, which should always be maintained at or about the elevation shown at Fig. 1 by the short horizontal lines through the part that is broken away.

I lay no claim to this part of the machine, since the same is substantially similar to ordinary gasometers, and I have described it only in order to indicate its relation to those parts which are of my invention and the more clearly to demonstrate their merit.

In the center of the water-tank B a vertical section, F, of another pipe is sustained by a connecting horizontal section, G, which passes through the wall of the tank, as shown. The upper extremity of section F, which is open, extends high enough to be always above the water in the tank, but yet not up to the top thereof, as seen at Fig. 1. A few inches outside the tank the section G of this pipe connects with another vertical section, H, which in its turn connects by a short horizontal elbow, I, with a pipe, J, in which there is a stop-cock, *g*, that extends nearly down to the bottom of the carburetor K, as shown by dotted lines, where it enters into the same and extends to the center thereof, where it turns abruptly down and passes through a perforated diaphragm and terminates just below the same. The said diaphragm is attached to the carburetor near its lower end, and subserves the purpose of a distributer of the air which passes through the pipe just described into the carburetor below it throughout every part of the hydrocarbon.

The carburetor K is perfectly air-tight everywhere, but is provided with two eduction-pipes, M N, and a short pipe capped by a funnel, L, through which the hydrocarbon is poured into it, which said pipes are provided respectively with stop-cocks *h i j*. The pipe M affords a conduit for the escape of the air when the hydrocarbon is poured into the carburetor. The pipe N leads to the burners.

I have ascertained by experiment that a carburetor should be constructed with a large instead of a small diameter, relatively of course to the number of burners to be supplied, so as always to present a large horizontal surface of hydrocarbon, while the vertical column of the same may vary in height from one-half to ten inches without appreciable difference of result, and that when placed as hereinafter described the effect is the same, whatever may be the temperature of the weather or atmosphere.

On the top of the carburetor K, on a hollow standard, I fix a recipient with a glass top for a dial-indicator, *o*, which is numbered near its margin precisely like a clock or watch. Through this hollow standard passes a vertical rod, *r*, which rests in a socket that is fixed on the bottom of the carburetor in such a manner as to be rotated in the easiest possible manner, which rod has a needle termination that passes through the dial O, above a shoulder on which the dial rests, to which an indicator or hand, *k*, is secured in such wise that when the hydrocarbon is one inch deep the float P, resting thereon, will, by its action on the rod R, cause the hand *k* to point to the figure or number 1, when it is two deep to the figure 2, and so on up to the highest point to which it is ever desirable to fill the carburetor. The rod R is turned, and by turning moves the hand through the agency of one or more projecting spiral threads, *l*, or grooves in lieu thereof, that take into or over corresponding grooves or threads, as the case may be, that are cut in an aperture in the center of float P, through which said rod passes, which are so calculated as to cause the said rod to be rotated just enough to move the hand *k* from one mark to another on the dial whenever the float P is raised or lowered one inch in the carburetor by the rising or falling of the hydrocarbon therein contained to that extent. The float is prevented from turning while rising and falling with the hydrocarbon by means of a sufficient number of guide-rods properly placed within the carburetor.

The float can be of any suitable size or shape, and it may or it may not be provided with perforations for the escape of the gas, accordingly as it may overspread the hydrocarbon to a greater or less extent.

The carburetor, as will be seen by the drawings, is inclosed in an open vessel, S, (to which, if necessary, I may apply a cover,) which latter is larger than the former to afford space between the walls of the two to receive sufficient water or other suitable packing to maintain a uniform temperature in the hydrocarbon, whatever may be the temperature of the external air, no matter what may be the volume of the continuous current or currents of air that is forced through it to be carbureted in any given case, or to supply any number of burners in actual use.

As the equivalents of water-packing under varying circumstances the following substances may be enumerated, to wit: sand, ashes, saw or cork dust, metallic filings, wood shavings, charcoal, and coke in form of powder or in lumps, and, indeed, all other substances or materials capable of producing the same effect. It is proper, also, to state that instead of surrounding with any of the above-named substances, I secure the same ends accomplished by them by sinking the carburetor without the tank S in a well of water or its equivalent, or by placing it directly under ground, so as only to expose the dial with its hand, the pipes M N, and the funnel L to view or to the influences of the external atmosphere; or I may place the carburetor, when the machine is intended to supply a head-light for the locomotive or to light a train of cars, without the tank S in the water contained in the tank of the tender of the locomotive, or in a separate compartment made therein, or in the tank S, anywhere on the locomotive or on the train of cars where it may be put with convenience and safety.

When the agent for maintaining a uniform temperature in the hydrocarbon is water or an equivalent liquid—such as a solution of water and glycerine—and the tank S and the carburetor are exposed and liable to be effected by the varying conditions of the external air, a proper temperature can be maintained in the hydrocarbon by means of a section of small divisional pipes, as shown at *t*, in which air brought from the main pipe through a branch pipe, T, is heated by a burner at the end of a pipe, U, leading from pipe N, (the air can also be heated by placing the pipe T inside of a steam-boiler or in a furnace or in contact with any other sources of heat,) and then conveyed through the continuation of said pipe T down into the said liquid, which is thus heated or kept at a proper temperature, and produces a corresponding effect in the hydrocarbon.

The water or other liquid may be drawn from the tank S by a suitable pipe provided with a stop-cock, as shown at Y. A similar arrangement may be employed to draw off the hydrocarbon from the carburetor.

When designed to be portable the machine may be secured to a platform or board, W, substantially as shown on the drawings. If designed to occupy a stationary position, it may be placed anywhere that convenience may suggest.

Should it be desirable to indicate the rise and fall of the hydrocarbon by a vertical dial, small bevel cog-wheels on the rod R and on a horizontal axis will accomplish this object.

I am aware that Alonzo C. Rand has obtained a patent, No. 62,364, for placing a carburetor surrounded by water in the earth; but his invention is different from mine in that when so surrounded the carburetor is placed within a gasometer, and that the air is thrown into it only in sufficient quantity to fill the gasometer from which the burners are supplied, the operation very being short and ceasing whenever the gasometer is filled. In other words, Rand's apparatus manufactures gas beforehand, the same being stored for future use—a most unsafe, not to say dangerous, arrangement, especially in cases wherein gas is produced for family use—whereas my apparatus makes the gas only as it is needed for use, and in just the quantity that is for the time being needed.

Beyond the danger incident to an accumulation of highly-carbureted air in a gasometer on the plan practiced by Rand and other inventors of improvements in carburetors, there is this further grave objection, to wit: The hydrocarbon gradually condenses in the gasometer and in the pipes under the influence of varying temperatures and changing seasons of the year, and hence after a while the gas loses its combustible and illuminating power and clogs the pipes with oil, and the apparatus ceases to be effectively operative. Mine, on the contrary, is wholly exempt from these objectionable characteristics.

I am also aware that W. H. Covel has obtained Letters Patent No. 91,213 for restoring the latent heat to hydrocarbon when employed for carbureting air; but his means for the accomplishment of this object consists of a stream of water, and consequently difficult of a practical application, and wholly unlike the means employed by me. Nor am I ignorant of the fact that other parties have proposed the application of heated sand and the like as a means for increasing the temperature of the hydrocarbon in the carburetor; but this also has been demonstrated by experiment to be an impracticable plan. My invention is wholly unlike any of the above-named, and, indeed, any other of which I have any knowledge. For

What I claim is—

1. The rod R, when constructed, arranged, and operating substantially as described, for the purpose set forth.

2. The pipe H, with or without pipe T, in combination with a recipient, A, a tank, B, and a carburetor, K, with or without an enveloping vessel, S, when these several parts are constructed, arranged, and operate substantially as herein described, for the purpose set forth.

3. The above combination, in combination with the rod R and its indicating appliances, substantially as and for the purpose set forth.

4. Carbureting atmospheric air by forcing a continuous current or currents of air through the carburetor, when said current or currents are so regulated that the precise quantity of air only that is needed and at the time it is needed for use is carbureted, and the means employed to accomplish this end are substantially as herein described.

ARTHUR BARBARIN.

Witnesses:

H. N. JENKINS,

RUFUS R. RHODES.